United States Patent [19]
Reh et al.

[11] 3,875,294
[45] Apr. 1, 1975

[54] PROCESS FOR CATALYTICALLY REACTING GASES HAVING A HIGH SULFUR DIOXIDE CONTENT

[75] Inventors: Lothar Reh, Bergen-Enkheim; Karl Vydra, Bad Nauheim; Karl-Heinz Doerr, Mainz; Hugo Grimm, Frankfurt am Main; Karl-Heinz Hennenberger, Hamburg, all of Germany

[73] Assignees: Metallgesellschaft Aktiengesellschaft, Frankfurt am Main; Norddeutsche Affinerie, Hamburg, both of, Germany

[22] Filed: Mar. 13, 1973

[21] Appl. No.: 340,784

[30] Foreign Application Priority Data
Mar. 21, 1972 Germany............................ 2213578

[52] U.S. Cl................................. 423/534, 423/522
[51] Int. Cl............................................ C01b 17/78
[58] Field of Search ............ 423/521, 522, 528, 532, 423/533, 534, 535, 536, 537, 538

[56] References Cited
UNITED STATES PATENTS

| | | | |
|---|---|---|---|
| 690,133 | 12/1901 | Clemm et al. | 423/534 |
| 729,735 | 6/1903 | Clemm et al. | 423/534 |
| 1,945,811 | 2/1934 | Jaeger | 423/533 |
| 1,965,963 | 7/1934 | Merrian | 423/538 |
| 2,042,675 | 6/1936 | Merrian | 423/528 |
| 3,005,687 | 10/1961 | Udy | 423/522 |
| 3,755,549 | 5/1971 | Guth | 423/533 |

FOREIGN PATENTS OR APPLICATIONS

| | | | |
|---|---|---|---|
| 2,026,818 | 12/1971 | Germany | 423/533 |
| 669,311 | 7/1948 | United Kingdom | 423/533 |

OTHER PUBLICATIONS

Riegel, Emil R., Industrial Chemistry, 1949 Reinhold Publishing Company, N.Y., N.Y., pgs. 21–23 & 32.

*Primary Examiner*—O. R. Vertiz
*Assistant Examiner*—Gary P. Straub
*Attorney, Agent, or Firm*—Burgess, Dinklage & Sprung

[57] ABSTRACT

Gases having a high sulfur dioxide content are reacted with oxygen to form sulfur trioxide in the presence of catalysts in contacting trays with interstage cooling between trays. The reaction gases are in flowing contact with catalyst bodies having a closed surface wherein the ratio of the contacted catalyst surface to the contacted catalyst volume is 120–400 meters$^{-1}$ and the residence time in each catalyst tray is 0.03 – 0.5 second.

10 Claims, 1 Drawing Figure

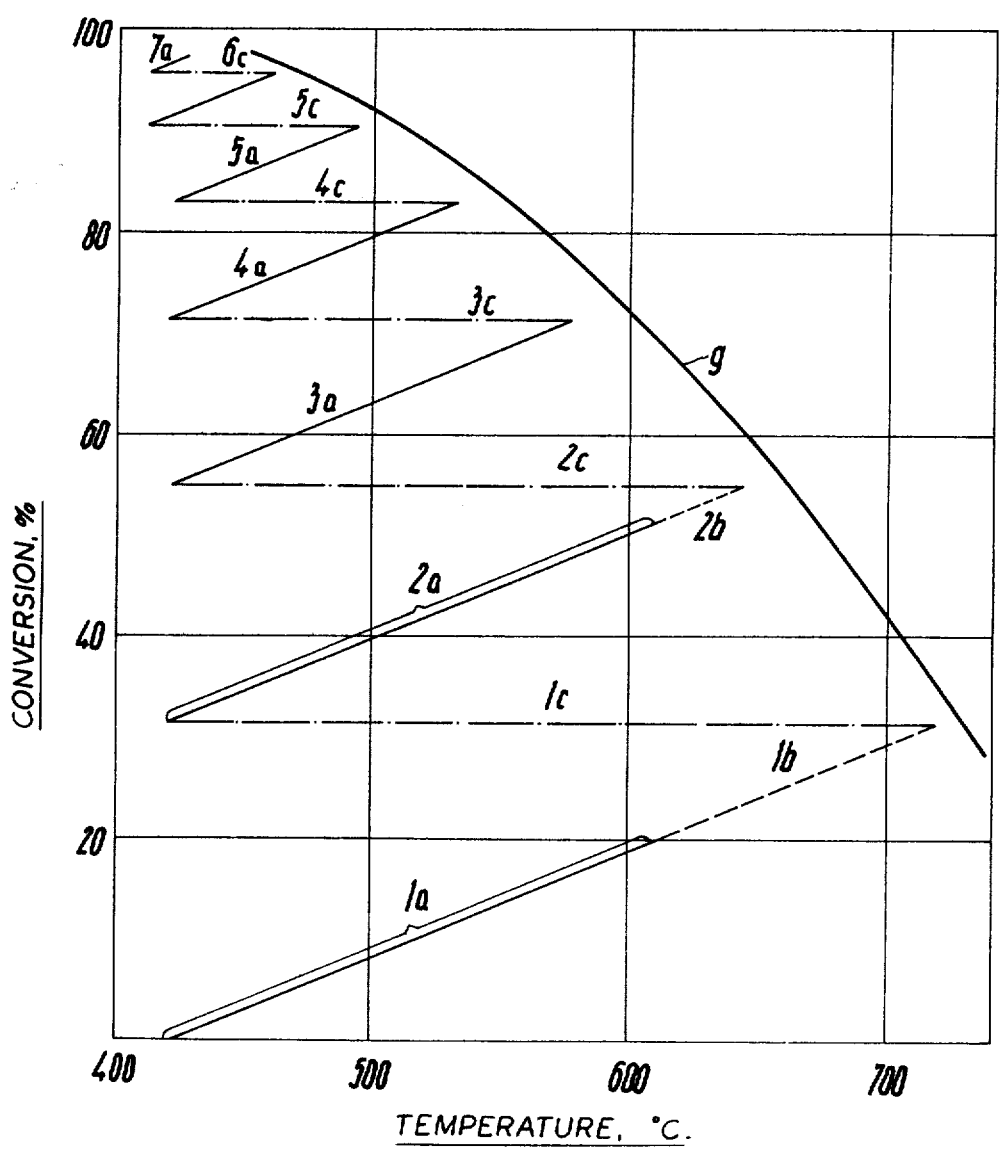

3,875,294

PROCESS FOR CATALYTICALLY REACTING GASES HAVING A HIGH SULFUR DIOXIDE CONTENT

BACKGROUND

This invention relates to a process for catalytically reacting gases having a high $SO_2$ content with oxygen in the presence of catalysts in contacting trays to form $SO_3$ with interstage cooling of the gases between contacting trays. In the reaction of $SO_2$-containing gases to form $SO_3$, followed by the production of sulfuric acid, the catalyst bed must be first heated by gas to the so-called initiation temperature. Where vanadium pentoxide ($V_2O_5$)-type catalysts are used, this initiation temperature is about 400°–450°C., depending on the composition and method of manufacture. The reaction of $SO_2$ to form $SO_3$ results in a temperature rise because the reaction is exothermic. If the gases contain up to about 11 percent $SO_2$, the reaction ceases at temperatures of about 620°C. because the equilibrium of the reaction $SO_2 + \frac{1}{2} O_2 \rightleftharpoons SO_3$ is then reached. If the gases have a higher $SO_2$ content, the temperature continues to rise because the reaction reaches an equilibrium only at higher temperatures. On the other hand, the catalyst deteriorates at temperatures above about 620°C.

To avoid deterioration of the catalyst by overheating, several methods of processing gases having a high $SO_2$ content have been proposed.

It is known, for instance, to reduce the $SO_2$ content of the feed gases by admixing partly reacted gases, which contain $SO_3$ to the starting gases (DAS 1,054,431 German Patent 504,635 and DOS 2,026,818). In these processes, gas must be passed through the contacting trays at a high rate, which increases with an increase in the $SO_2$ content. A uniform mixing is difficult in commercial operation, and the contacting vessel must be larger in size in accordance with the gas recycle rate.

It is also known to react gases containing up to 14 percent $SO_2$ under conditions involving an oxygen deficiency, and to blow in dried cold air in stages to supply additional oxygen to the gases and to cool them (U.S. Pat. No. 2,180,727). This process has the disadvantage that expensive means and control systems are required for a uniform mixing of gas and air and that the cross-section of the container must increase from stage to stage in proportion with the gas volume.

In the case of gases containing about 8–11 percent $SO_2$, it is known to conduct a partial stream at a velocity of flow of 0.6–2 meters per second through a preliminary catalyst unit, which precedes the main catalyst unit, to mix the $SO_3$-containing gases leaving the preliminary catalyst unit with colder gases, which contain $SO_2$, and to react the mixed gases in the conventional manner in the main catalyst unit (Austrian Patent Application A 10932/68). This process requires a separate, preliminary catalyst unit and cannot be used with highly concentrated gases.

It is also known in the reaction of $SO_2$-containing gases in a tray-type contacting unit to control the temperature peak by a variation of the $V_2O_5$ content of the catalysts (Helv. Chim. Acta 24, Special Edition 71 E–79 E, 13/12, 1941, Basel, Ges. f. chem. Ind.). When this method is used to process gases having a high $SO_2$ content, many contacting trays are required and the presure loss in the contacting plant is correspondingly high.

SUMMARY

It is an object of the invention to process gases having a very high $SO_2$ content without dilution with inert gases or with an addition thereof only in very small quantities, only with an admixing of the oxygen required for the reaction, and with simple equipment and operations.

This object is accomplished according to the invention by reacting flowing gases containing 15–60 percent by volume $SO_2$ with oxygen in contacting trays on catalyst bodies having a closed surface wherein the ratio of the catlyst surface contacted by the flowing gase to the catalyst volume contacted by the flowing gas is 120–400 meters$^{-1}$, and the residence time in each contacting tray is 0.03–0.5 second.

DESCRIPTION OF THE DRAWING

The accompanying drawing is a graph charting the conversion of $SO_2$ to $SO_3$ against the temperature.

DESCRIPTION

The ratio of the catalyst surface contacted by the flowing gas to the catalyst volume contacted by the flowing gas ($m^2/m^3 = m^{-1}$) is calculated from the external dimensions of the individual catalyst bodies. With spherical catalyst body which is 50 millimeters in diameter, for instance, said ratio is about 120 meters$^{-1}$ or 0.12 millimeter$^{-1}$.

The catalyst bodies may consist of compact spheres, cylinders, eggs or briquettes. They may also consist of bodies which have the above-mentioned three-dimensional shapes and are coated with the catalyst substance. There should be no cavities through which the gases can flow, as in rings or hollow cylinders, although pores in the catalyst bodies do not constitute cavities.

The most desirable shape of the catalyst bodies is spherical because sperical catalyst bodies can easily be made and stored and result in the smallest loss in pressure of the gas flowing through where compact catalyst bodies are employed.

The measures adopted in accordance with the invention are particularly applicable to catalysts based on vanadium pentoxide. The residence time of the gas within the stated range will depend on the composition of the catalyst and the process of making it. The residence time increases with an increase in $SO_2$ content and an increase of the conversion to $SO_3$ and with a decrease of the oxygen content.

In a preferred embodiment, the ratio of the surface contacted by the flowing gas to the volume contacted by the flowing gas is 200–300 meters$^{-1}$. Particularly good results will be obtained in this range.

In a further preferred embodiment, the residence time is 0.05–0.3 second. Particularly good results will be obtained in that range.

Another desirable feature is that the ratio of the concentrations of $SO_2:O_2$ by volume is 1.25–2.0, preferably 1.6–1.9. In spite of a stoichiometric surplus of oxygen, the reaction rate is initially lowered.

A particularly desirable feature is that the catalytic reaction is carried out in a dual-tray unit, which comprises a first contacting tray containing $V_2O_5$-type catalyst and succeeded without interstage cooling by a second contacting tray containing iron oxide-type catalyst, and the reaction is conducted in said second tray close to the equilibrium of the reaction $SO_2 + \frac{1}{2} O_2 \rightleftarrows SO_3$. In the first contacting tray, the gases are reacted to a degree which is selected in view of the permissible temperature rise of the catalyst or the optimum temperature for the reaction. At the resulting reaction temperature, the gases are then directly fed into the second contacting tray to leave the same at a much higher temperature of, e.g., 700°C. so that there is no interstage cooling of the gases after the first contacting tray and the gases have a higher temperature when leaving the second contacting tray. As a result, a larger temperature drop is available for the cooling of the gases. The required residence time of the gases in the contacting tray containing the catalyst based on iron oxide depends highly on the composition of the catalysts and the method by which they have bean made and on the composition of the gases. For this reason, the residence time required to reach the equilibrium must be ascertained in each case. The required residence time is generally longer than the residence time in the contacting tray containing the vanadium pentoxide-type catalyst.

A further preferred embodiment is that the catalytic reaction is carried out in at least two dual-tray units connected in series.

Using a contacting tray containing a vanadium pentoxide-type catalyst and a contacting tray containing an iron oxide-type catalyst, the process of the invention can be carried out in series-connected contacting trays in a number which is sufficient to lower the $SO_2$ content to a point where further processing is carried out in the conventional manner.

The gases leaving the second contacting tray of the dual-tray unit are preferably indirectly cooled as they leave the second tray. Because the gases are at a high temperature, they may be cooled with generation of saturated steam. The immediately succeeding cooling results in savings and advantages as regards equipment and technology.

According to another preferred feature, the iron oxide-type catalyst and the vanadium pentoxide-type catalyst lie in two separate, superimposed layers on a common grate with a gas-permeable, non-reactive, heat-insulating layer interposed between the two layers. In such an arrangement, a transfer of heat from the contacting tray containing iron oxide-type catalyst to the vanadium pentoxide-type catalyst is avoided. This is particularly important during a shutdown. Besides, a grate is saved, which otherwise would be subjected to high thermal stresses.

According to another preferred feature, $SO_3$-containing gases are admixed to the $SO_2$-containing gases before the latter are fed to the first contacting tray. The activity of the catalysts, particularly in the first contacting tray, decreases in the course of time so that the convesion decreases. This measure makes it possible to maintain the desired temperature and reaction in the catalyst because the $SO_3$-containing gases which are admixed have initially a restraining activity, which is reduced as the activity of the catalyst is reduced, so that the desired temperature and the desired conversion can be held constant. The $SO_3$- containing gases may be branched off after any desired contacting tray. Preferably, an absorber is incorporated in the path along which the $SO_3$-containing gases are recycled, and the rate at which $SO_3$ is recycled is controlled by a control of the degree of absorption of the absorber.

According to a further preferred feature, the gases are conducted through the contacting trays from bottom to top so that the permeability of the catalyst bed to gas is deteriorated less by the deposition of fine solids. This measure may be adopted because in accordance with the invention the particle size of the catalyst and the residence time are selected to provide for such a velocity of flow of the gases that the catalyst bed is not fluidized and is nevertheless cleaned.

For the sake of economy, the catalyst bed in the contacting trays is as thin as possible because in that case the residence time required according to the invention can be achieved with the gases flowing at a lower velocity. As a result, the pressure loss in the contacting tray is reduced and a smaller quantity of catalyst is sufficient. The catalyst bed has desirability height of about 30–60 centimeters.

The process according to the invention may be used for a catalysis with and without interstage absorption.

The invention will be explained more in detail with reference to the examples and the drawing.

The drawing is a graph showing the conversion from $SO_2$ to $SO_3$ in dependence on the gas temperature in Example 2b.

In all examples, the conversion from $SO_2$ to $SO_3$ and the temperatures are stated for various gas compositions in dependence on the residence time in the several contacting trays and the ratio of the catalyst surface contacted by the flowing gas to the catalyst volume contacted by the flowing gas. In all examples, the conversion was conducted until the ratio of $SO_2$ to $SO_3$ was such as to enable a subsequent catalytic reaction to be carried out in known manner. In the Tables, columns 1 to 7 contain the following data:

Column 1: Consecutive number of contacting trays
Column 2: Type of catalyst
Column 3: Temperature of gas entering the contacting tray, °C.
Column 4: Temperature of the gas leaving the contacting tray °C.
Column 5: Total conversion of the gas as it leaves the contacting tray,%
Column 6: Ratio of catalyst surface contacted by the flowing gas to catalyst volume contacted by the flowing gas, in meters$^{-1}$, for spherical catalyst bodies
Column 7: Residence time of the gases in the contacting tray in seconds In column 2, the formula "$V_2O_5$" designates vanadium pentoxide-type catalyst.

In column 2, the symbol "Fe" designated iron oxide-type catalyst.

Example 1a

| Composition of gas entering the first contacting tray | 15.0% $SO_2$<br>8.0% $O_2$ |
|---|---|
| Composition of gas leaving the first contact tray | 8.9% $SO_2$<br>5.0% $O_2$<br>6.5% $SO_3$ |

| 1 | 2 | 3 | 4 | 5 | 6 | 7 |
|---|---|---|---|---|---|---|
| 1 | $V_2O_5$ | 420 | 610 | 42 | 400 | 0.45 |

Example 1b

| Composition of gas entering the first contacting tray | 35.0% SO$_2$<br>29.0% O$_2$ |
|---|---|
| Composition of gas leaving the last contacting tray | 15.6% SO$_2$<br>10.6% O$_2$<br>23.4% SO$_3$ |

| 1 | 2 | 3 | 4 | 5 | 6 | 7 |
|---|---|---|---|---|---|---|
| 1 | V$_2$O$_5$ | 420 | 610 | 20 | 300 | 0.096 |
| 2 | V$_2$O$_5$ | 420 | 610 | 40 | 400 | 0.303 |
| 3 | V$_2$O$_5$ | 420 | 610 | 60 | 400 | 0.88 |
| 3a | V$_2$O$_5$ | 420 | 610 | 60 | 750 | 0.56 |

For the catalyst bodies used in contacting tray 3, the ratio of the catalyst surface contacted by the flowing gas to the catalyst volume contacted by the flowing gas was too low so that the residence time required for the desired conversion in this contacting tray was too long. For this reason, the ratio was increased by the use of a normal catalyst bed, the reaction in the catalyst tray 3a being effected in known manner.

Example 1c

| Composition of gas entering the first contacting tray | 60% SO$_2$<br>35.0% O$_2$ |
|---|---|
| Composition of gas leaving the last contacting tray | 31.7% SO$_2$<br>21.9% O$_2$<br>40.3% SO$_3$ |

| 1 | 2 | 3 | 4 | 5 | 6 | 7 |
|---|---|---|---|---|---|---|
| 1 | V$_2$O$_5$ | 420 | 610 | 14 | 200 | 0.068 |
| 2 | V$_2$O$_5$ | 420 | 610 | 28 | 240 | 0.191 |
| 3 | V$_2$O$_5$ | 420 | 610 | 42 | 300 | 0.34 |
| 4 | V$_2$O$_5$ | 420 | 610 | 56 | 400 | 0.544 |

Example 2a

| Composition of gas entering the first contacting tray | 15.0% SO$_2$<br>8.0% O$_2$ |
|---|---|
| Composition of gas leaving the last contacting tray | 8.4% SO$_2$<br>4.7% O$_2$<br>7.1% SO$_3$ |

| 1 | 2 | 3 | 4 | 5 | 6 | 7 |
|---|---|---|---|---|---|---|
| 1 | V$_2$O$_5$ | 420 | 610 | 40 | 400 | 0.45 |
| 2 | Fe | 610 | 641 | 46 | 400 | |

Example 2b

| Composition of gas entering the first contacting tray | 35.0% SO$_2$<br>20.0% O$_2$ |
|---|---|
| Composition of gas leaving the last contacting tray | 17.4% SO$_2$<br>11.5% O$_2$<br>21.3% SO$_3$ |

| 1 | 2 | 3 | 4 | 5 | 6 | 7 |
|---|---|---|---|---|---|---|
| 1 | V$_2$O$_5$ | 420 | 610 | 20 | 300 | 0.96 |
| 2 | Fe | 610 | 720 | 31.5 | 400 | |
| 3 | V$_2$O$_5$ | 420 | 598 | 50 | 400 | 0.51 |
| 4 | Fe | 598 | 646 | 55 | 400 | |

The drawing represents the course of the reaction in the several contacting trays. Curve g is the equilibrium curve for the reaction SO$_2$ + ½ O$_2$ ⇌ SO$_3$. The solid lines (—) 1a to 7a represent the conversion of gas in the contacting trays which contain vanadium pentoxide-type catalyst.

Dotted lines (---) 1b and 2b represent the conversion of the gas in the contacting trays which contain iron oxide-type catalyst.

Dash-dot lines (— - —) 1c to 6c represent the interstate cooling steps.

Example 2c

| Composition of gas entering the first contacting tray | 60.0 % SO$_2$<br>35.0 % O$_2$ |
|---|---|
| Composition of gas leaving the last contacting tray | 30.2 % SO$_2$<br>21.1 % O$_2$<br>42.6 % SO$_3$ |

| 1 | 2 | 3 | 4 | 5 | 6 | 7 |
|---|---|---|---|---|---|---|
| 1 | V$_2$O$_5$ | 420 | 610 | 14.0 | 200 | 0.068 |
| 2 | Fe | 610 | 780 | 27.0 | 240 | |
| 3 | V$_2$O$_5$ | 420 | 610 | 41.0 | 240 | 0.41 |
| 4 | Fe | 610 | 700 | 47.5 | 240 | |
| 5 | V$_2$O$_5$ | 420 | 610 | 64.0 | 400 | 0.638 |

Example 3

| Composition of gas entering the first contacting tray | 60.0 % SO$_2$<br>35.0 % O$_2$ |
|---|---|

| 1 | 2 | 3 | 4 | 5 | 6 | 7 |
|---|---|---|---|---|---|---|
| 1 | V$_2$O$_5$ | 420 | 610 | 14.0 | 200 | 0.068 |
| 2 | Fe | 610 | 750 | 23.5 | 240 | |
| 3 | V$_2$O$_5$ | 420 | 610 | 32.0 | 240 | 0.41 |
| 4 | Fe | 610 | 690 | 43.0 | 240 | |
| 5 | V$_2$O$_5$ | 420 | 610 | 58.0 | 400 | 0.638 |

| Composition of gas leaving the last contacting tray | 30.2% SO$_2$<br>21.1% O$_2$<br>42.6% SO$_3$ |
|---|---|

In an interstage absorption step, the SO$_3$ was removed from the gas, which after the interstage absorption step had the following composition 52.6% SO$_2$
36.8% O$_2$

| 1 | 2 | 3 | 4 | 5 | 6 | 7 |
|---|---|---|---|---|---|---|
| 6 | $V_2O_5$ | 420 | 610 | 14.5 | 200 | 0.061 |
| 7 | Fe | 610 | 740 | 23.0 | 240 | |
| 8 | $V_2O_5$ | 420 | 610 | 36.5 | 300 | 0.205 |
| 9 | Fe | 610 | 690 | 42.5 | 300 | |
| 10 | $V_2O_5$ | 420 | 610 | 56.0 | 400 | 0.405 |

| | |
|---|---|
| Composition of gas leaving the last contacting tray | 26.9% $SO_2$ |
| | 25.3% $O_2$ |
| | 34.2% $SO_3$ |
| The total conversion on both stages amounted to | 82% |

The invention provides an economical, commercially desirable method of processing gases having a high $SO_2$ content, such as are obtained in metallurgy, where oxygen is increasingly used, e.g., when sulfide ores are processed in a melting cyclone, or when sulfur is burnt with oxygen, or in desorption processes carried out for environmental protection. In the process according to the invention, the disadvantages involved in a subsequent admixing of $SO_3$ or air are avoided and the pressure loss in the catalytic reaction plant is low owing to the dimensions of the catalyst bodies according to the invention and the relatively small height of the catalyst beds in the contacting trays.

What is claimed is:

1. Process for reacting gases having a sulfur dioxide content of 15–16 percent by volume with oxygen to form sulfur trioxide which comprises reacting said gases containing sulfur dioxide with oxygen in a plurality of stages, with cooling of the gases between each of the stages, in flowing contact with catalyst bodies contained in contacting trays in each of the stages, the ratio of the surface of the catalyst bodies to actual volume of the catalyst bodies contacted by the flowing gas being 120–400 meters$^{-1}$ and the residence time in each contracting tray being 0.03–0.5 second and at temperatures below which the catalyst deteriorates due to heat.

2. Process of claim 1 wherein the ratio of the surface of the catalyst bodies to actual volume of the catalyst bodies contacted by the flowing gas is 200-300 meters$^{-1}$.

3. Process of claim 1 wherein the residence time in each contacting tray is 0.05–0.3 second.

4. Process of claim 1 wherein the initial volume ratio of sulfur dioxide to oxygen is 1.25–2.0.

5. Process of claim 1 wherein the catalyst bodies in each of the contacting trays is a vanadium pentoxide based catalyst having said surface to volume ratio and each stage has, in addition, a second contacting tray containing an iron oxide based catalyst, the reaction being conducted in the second tray close to the equilibrium of the reaction $SO_2 + \frac{1}{2} O_2 \rightleftharpoons SO_3$.

6. Process of claim 5 wherein said reaction is carried out in at least two stages connected in series.

7. Process of claim 5 wherein the gases are cooled indirectly between each of the stages.

8. Process of claim 5 wherein the iron oxide based catalyst and the vanadium pentoxide based catalyst are positioned in two layers on a common grate with a gas-permeable, non-reactive heat-insulating layer therebetween.

9. Process of claim 1 wherein sulfur trioxide containing gases are admixed with the sulfur dioxide gases before being fed to the first of said stages.

10. Process of claim 1 wherein said gases are conducted through said contacting trays in each of said stages from bottom to top.

* * * * *